(12) United States Patent
Shand

(10) Patent No.: US 11,513,196 B2
(45) Date of Patent: Nov. 29, 2022

(54) TERRAIN ADAPTIVE PULSE POWER IN A SCANNING LIDAR

(71) Applicant: Waymo LLC, Mountain View, CA (US)

(72) Inventor: Mark Alexander Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 643 days.

(21) Appl. No.: 16/145,647

(22) Filed: Sep. 28, 2018

(65) Prior Publication Data
US 2020/0103500 A1 Apr. 2, 2020

(51) Int. Cl.
G01S 7/48 (2006.01)
G01S 7/484 (2006.01)
G01S 17/931 (2020.01)

(52) U.S. Cl.
CPC ............ *G01S 7/484* (2013.01); *G01S 17/931* (2020.01)

(58) Field of Classification Search
None
See application file for complete search history.

(56) References Cited

U.S. PATENT DOCUMENTS

| | | |
|---|---|---|
| 4,288,158 A | 9/1981 | Frungel |
| 6,784,840 B2 | 8/2004 | Menegozzi et al. |
| 8,818,609 B1 | 8/2014 | Boyko et al. |
| 9,052,721 B1 | 6/2015 | Dowdall et al. |
| 9,804,264 B2 | 10/2017 | Villeneuve et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,874,635 B1 | 1/2018 | Eichenholz et al. |

(Continued)

FOREIGN PATENT DOCUMENTS

| | | |
|---|---|---|
| JP | H07134178 | 5/1995 |
| JP | H08201520 | 8/1996 |

(Continued)

OTHER PUBLICATIONS

International Searching Authority, International Search Report and Written Opinion dated Jan. 3, 2020, issued in connection with International Patent Application No. PCT/US2019/050514, filed on Sep. 11, 2019, 9 pages.

(Continued)

*Primary Examiner* — Hovhannes Baghdasaryan
(74) *Attorney, Agent, or Firm* — McDonnell Boehnen Hulbert & Berghoff LLP

(57) ABSTRACT

The present disclosure relates to systems and methods involving Light Detection and Ranging (LIDAR or lidar) systems. Namely, an example method includes causing a light source of a LIDAR system to emit light along an emission vector. The method also includes adjusting the emission vector of the emitted light and determining an elevation angle component of the emission vector. The method further includes dynamically adjusting a per pulse energy of the emitted light based on the determined elevation angle component. An example system includes a vehicle and a light source coupled to the vehicle. The light source is configured to emit light along an emission vector toward an environment of the vehicle. The system also includes a controller operable to determine an elevation angle component of the emission vector and dynamically adjust a per pulse energy of the emitted light based on the determined elevation angle component.

20 Claims, 9 Drawing Sheets

(56) References Cited

U.S. PATENT DOCUMENTS

| | | | |
|---|---|---|---|
| 9,958,545 B2 | 5/2018 | Eichenholz et al. | |
| 2006/0203248 A1* | 9/2006 | Reichardt | G01N 21/53 |
| | | | 356/437 |
| 2007/0021915 A1* | 1/2007 | Breed | G08G 1/164 |
| | | | 701/301 |
| 2014/0144390 A1* | 5/2014 | Duncan | A01M 29/18 |
| | | | 119/713 |
| 2015/0226853 A1 | 8/2015 | Seo et al. | |
| 2016/0291155 A1* | 10/2016 | Nehmadi | G01S 17/89 |
| 2017/0153319 A1* | 6/2017 | Villeneuve | H01S 3/08086 |
| 2017/0242102 A1* | 8/2017 | Dussan | G01S 17/89 |
| 2017/0269197 A1 | 9/2017 | Hall et al. | |
| 2018/0120440 A1 | 5/2018 | O'Keeffe | |
| 2018/0188360 A1 | 7/2018 | Berger et al. | |

FOREIGN PATENT DOCUMENTS

| | | |
|---|---|---|
| JP | 2011257192 | 12/2011 |
| JP | 2016057141 | 4/2016 |
| KR | 1020170106547 | 9/2017 |
| WO | 2017/045816 | 3/2017 |
| WO | 2018/055449 | 3/2018 |
| WO | 2018/055611 | 3/2018 |

OTHER PUBLICATIONS

Fersch et al., "Comparison of laser safe scanning patterns for second generation LiDAR deflection units," The 18th International Radar Symposium IRS 2017, Jun. 28-30, 2017, Prague, Czech Republic, 9 pages.

European Patent Office, Extended European Search Report dated Jun. 29, 2021, issued in connection with European Patent Application No. 19867968.0, 10 pages.

Japanese Patent Office, Notice of Reasons for Rejection dated May 13, 2021, issued in connection with Japanese Patent Application No. 2020-526078, 4 pages (English Translation).

* cited by examiner

TERRAIN ADAPTIVE PULSE POWER IN A SCANNING LIDAR

BACKGROUND

Unless otherwise indicated herein, the materials described in this section are not prior art to the claims in this application and are not admitted to be prior art by inclusion in this section.

Light Detection and Ranging (LIDAR or lidar) systems emit light into the environment so as to determine information about objects based on emitted light that is reflected from those objects. LIDAR range and sensitivity is fundamentally constrained by the amount of energy emitted into the environment. That is, increasing the amount of energy per light pulse or continuous light signal generally enables unambiguous detection of objects at longer ranges. However, the laser emissions are themselves constrained by laser safety considerations that limit accessible laser emissions as well as by operational parameters of the laser light source that limit its average light pulse power.

Conventional LIDAR systems may scan laser light over a nominal vertical angle range of +/−7 degrees (pitch). At a distance of 100 meters from the LIDAR system, such an angle range may scan a vertical extent of approximately 24 meters in height. In many situations, semi- or fully-autonomous vehicles need not detect objects within such a large vertical extent. As such, it is desirable to distribute light energy into an environment of a LIDAR system more efficiently.

SUMMARY

The present disclosure generally relates to light detection and ranging (LIDAR) systems, which may be configured to obtain information about an environment. Such LIDAR devices may be implemented in vehicles, such as autonomous and semi-autonomous automobiles, trucks, motorcycles, and other types of vehicles that can move within their respective environments.

In a first aspect, a system is provided. The system includes a vehicle and a light source coupled to the vehicle. The light source is configured to emit light at least one light pulse toward an environment of the vehicle. The system also includes a controller operable to determine an emission vector of the at least one light pulse, determine an elevation angle component of the emission vector, and dynamically adjust a per pulse energy of a subsequent light pulse based on the determined elevation angle component.

In a second aspect, a method is provided. The method includes causing a light source of a light detection and ranging (LIDAR) system to emit light along an emission vector. The method includes adjusting the emission vector of the emitted light according to a scanning pattern. The method yet further includes determining an elevation angle component of the emission vector. The method also includes dynamically adjusting an energy of the emitted light based on the determined elevation angle component.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In an example embodiment, a LIDAR system may dynamically adjust a per pulse energy of the emitted light based on local terrain and/or an elevation angle of an emission vector. As a result, the LIDAR system may more efficiently and controllably emit laser power into its environment. For example, such a LIDAR system may provide higher-energy laser pulses when scanning at elevation angles corresponding to the few meters at and above the road surface. Furthermore, the LIDAR system may provide lower-energy laser pulses at other elevation angles or emission vectors, such as those expected to emit light toward objects near the vehicle (e.g., a ground surface or another type of close-range object).

In such a manner, the LIDAR system may more efficiently distribute light energy within its environment while maintaining the same or similar average power over timescales of relevance to laser classification and the operational limitations of the laser light source.

Some embodiments of this disclosure may include LIDAR systems that mechanically scan in both elevation (pitch) and yaw. However, it will be understood that the systems and methods described herein could be applied to any LIDAR system with dynamically-controllable scanning, and which could also be subject to laser safety classifications based on an average amount of laser light emission power.

II. Example Systems

Figure 1:
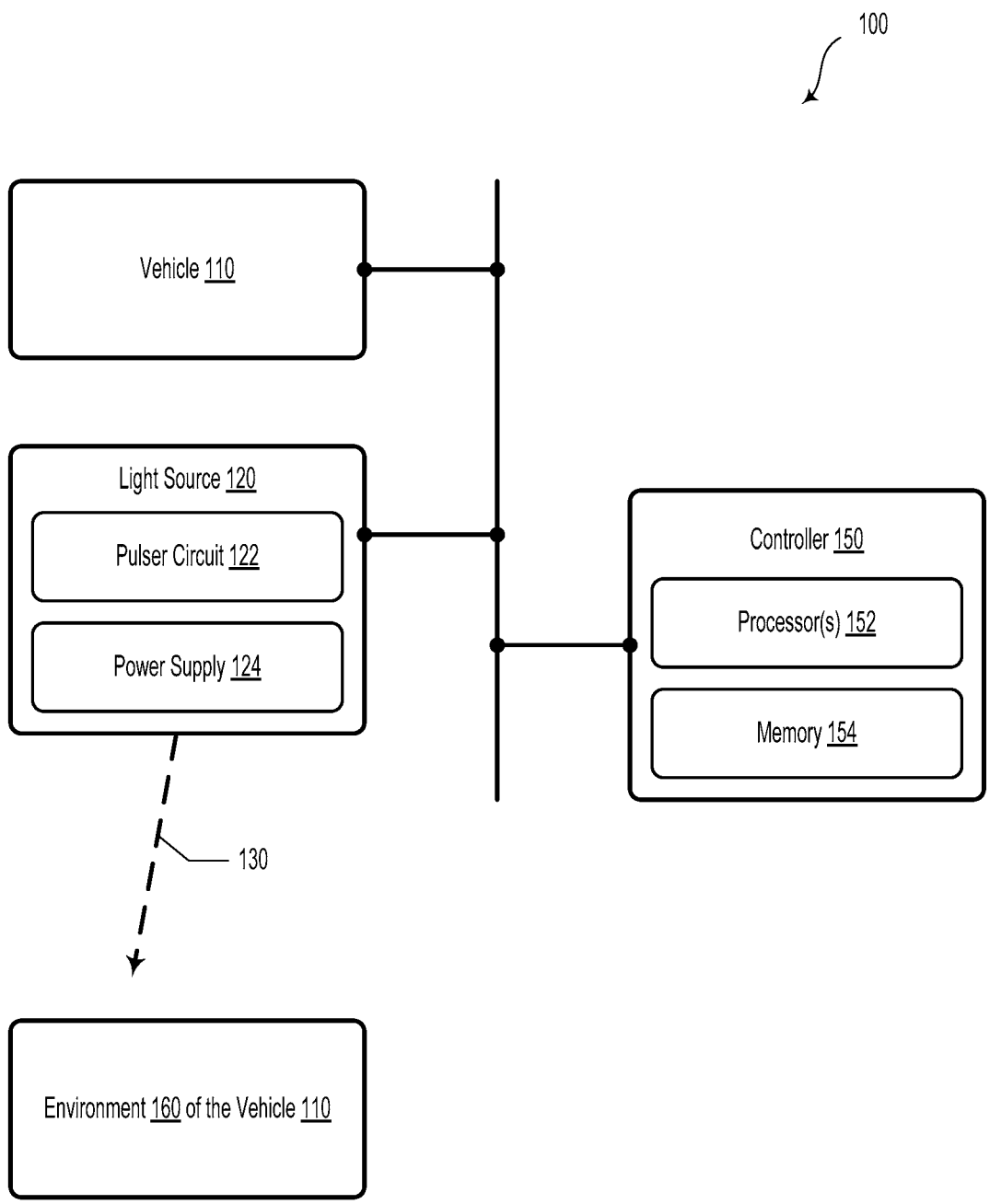
FIG. 1 illustrates a system, according to an example embodiment.

FIG. 1 illustrates a system 100, according to an example embodiment. System 100 includes a vehicle 110 and a light source 120 coupled to the vehicle 110. The light source 120 is configured to emit light along an emission vector 130 toward an environment 160 of the vehicle 110. In some embodiments, the emitted light could include a plurality of light pulses. Additionally or alternatively, the light source 120 could emit the emitted light as a continuous light beam. In some embodiments, the light source 120 could include a fiber laser operable to emit light having a wavelength of 905 nanometers or 1550 nanometers. It will be understood that other types of light-emitter devices and/or emission wavelengths are possible and contemplated herein.

In some embodiments, system 100 could include a light detection and ranging (LIDAR) system. In such scenarios, the light source 120 could represent an element of the LIDAR system. In some embodiments, the system 100 may be incorporated as part of a sensing system of an autonomous or semi-autonomous vehicle, such as vehicle 300 as illustrated and described below in reference to FIG. 3.

Returning to FIG. 1, as described herein, the emission vector 130 could represent the magnitude and the direction of light emitted from the light source 120. As an example, the direction of light emitted from the light source 120 could be based on a reference plane, which could include a horizontal plane and/or a plane corresponding with, and/or parallel with at least a portion of a ground surface. In some embodiments, the emission vector 130 could include an elevation angle component and a yaw angle component. In such scenarios, the elevation angle component could include a positive or negative angle value based on an angular difference between the direction of light emitted from the light source 120 and the reference plane. Furthermore, the yaw angle component could include, for example, a positive or negative angle value based on an angular difference between the direction of light emitted from the light source 120 and at least one of: a front of a vehicle or a direction of travel of the vehicle.

The light source 120 could include a pulser circuit 122, which could be configured to provide current pulses so as to cause the light source 120 to emit light pulses. In an example embodiment, the pulser circuit 122 could include one or more field effect transistors (FETs). For instance, the pulser circuit 122 may include a plurality of GaN FETs that could be operable to control one or more characteristics of light emitted from the light source 120. For example, the controllable characteristics could include a pulse duration, pulse power, etc.

Additionally or alternatively, the light source 120 could include a power supply 124. The power supply 124 could provide the appropriate operating conditions (e.g., supply voltage/current) for the light source 120. In some scenarios, the power supply 124 could be operable to control one or more characteristics of a laser power amplifier and/or a seed laser. In some embodiments, the power supply 124 could be operable to adjust an average energy and/or wavelength of light emitted by the light source 120.

The system 100 also includes a controller 150. The controller 150 may include an on-board vehicle computer, an external computer, or a mobile computing platform, such as a smartphone, tablet device, personal computer, wearable device, etc. Additionally or alternatively, the controller 150 may include, or be connected to, a remotely-located computer system, such as a cloud server network. In an example embodiment, the controller 150 may be configured to carry out some or all method blocks or steps described herein.

The controller 150 may include one or more processors 152 and at least one memory 154. The processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory 154 so as to carry out various operations described herein.

Additionally or alternatively, the controller 150 could include a circuit (e.g., a synchronous digital circuit) operable to carry out the various operations described herein. For example, the circuit may include a shot table. Other functions of the circuit (e.g., reading and sequencing) may be performed by a synchronous digital logic circuit. In some embodiments, the circuit and its operation may be specified in Verilog or another hardware description language. In such scenarios, the controller 150 need not include a processor.

In some embodiments, the operations carried out by the controller 150 could include determining the emission vector 130 of at least one light pulse and/or the corresponding light source 120. In some examples, the emission vector 130 could be determined based on a location and/or an orientation of the light source 120 with respect to the environment.

The operations carried out by the controller 150 include determining an elevation angle component of the emission vector 130. As an example, determining the elevation angle component of the emission vector 130 could include calculating a length of a vector projection of the emission vector 130 on a reference plane and/or a reference axis. Other ways to determine the elevation angle component of the emission vector 130 are possible and contemplated.

The operations carried out by the controller 150 could include dynamically adjusting a per pulse energy of one or more subsequent light pulses based on the determined elevation angle component.

In some embodiments, the light source 120 could be configured to emit light in a scanning pattern according to a desired scanning path. In such scenarios, the controller 150 could be operable to adjust the emission vector 130 of the emitted light according to the scanning pattern and the desired scanning path. In such scenarios, the controller 150 could dynamically adjust the energy of emitted light provided according to various portions of the scanning pattern and desired scanning path. For example, for portions of the desired scanning path that correspond to an elevation angle component less than a threshold angle (e.g., zero degrees elevation) or plane, the controller 150 could provide emitted light with a first energy. In such a scenario, for portions of the desired scanning path that correspond to an elevation angle component greater than the threshold angle, the controller 150 could provide emitted light having a second energy.

While the above example includes a threshold angle, it will be understood that other angle threshold values, angle ranges, spatial regions, and/or target locations could be considered while the controller 150 dynamically adjusts the energy of emitted light from light source 120.

In some embodiments, the controller 150 could be operable to dynamically adjust the energy of the emitted light further based on at least one of: point cloud data, map data, image data, object data, retroreflector location data, time of day, ambient light condition, sun position, a pose of the vehicle 110, a heading of the vehicle 110, or an operating condition of the vehicle 110. For example, an effective "dose" of light pulses that can be safely provided to a human subject (e.g., a pedestrian) may depend on the human subject's pupil dilation, which, in turn, could be affected by such factors as time of day or ambient lighting conditions. In particular, in dark conditions, a person's dilated pupils (e.g., mydriasis) could transmit a larger amount of a given light pulse to the person's retina as compared to bright conditions, where a person's pupils may be more constricted (e.g., miosis).

In other examples, the controller 150 could adjust the energy of emitted light based on a location or type of objects in the environment 160. For instance, if another vehicle is within the same roadway as vehicle 110, a relatively higher energy of emitted light may be provided so as to maintain positive identification of the other vehicle within the scanning range. However, if a road sign (e.g., stop sign, pedestrian-crossing sign, etc.) or other type of static object is observed, subsequent light emitted toward such an object may be provided with relative lower energy. Adjustment of emitted light energy values according to other such "priority" or "regions of interest" are possible and contemplated herein.

As noted above, retroreflectors may represent objects in the environment 160 that reflect a higher-than-average portion of the emitted light back toward the system 100. In some cases, retroreflectors can temporarily "blind" LIDAR systems by saturating detectors or introducing cross-talk interference in the system. In order to reduce these effects, the controller 150 could reduce the energy of emitted light provided to locations with known retroreflectors. For example, the controller 150 could provide emitted light toward retroreflectors with $\frac{1}{100}^{th}$ or $\frac{1}{10}^{th}$ the energy of light provided to other regions of the environment.

In scenarios that include light emitted as a plurality of light pulses, the plurality of light pulses could include a pulse length of at least one light pulse of the plurality of light pulses as being between 10 picoseconds to 10 nanoseconds. Other pulse lengths are possible and contemplated herein.

Additionally or alternatively, the controller 150 could be operable to dynamically adjust a pulse energy of at least one light pulse of the plurality of light pulses. The pulse energy of at least one light pulse could be between 10 nanojoules and 10 microjoules. Other pulse energies are contemplated and possible. In an example embodiment, the controller 150 could dynamically adjust the pulse energy by adjusting at least one of the pulser circuit 122 and/or the power supply 124 of the light source 120. Other ways to dynamically adjust the pulse energy are possible and contemplated.

In some embodiments, a pulse repetition rate of at least a portion of the plurality of light pulses is between 50 kilohertz and 1 megahertz. Other pulse repetition rates are contemplated and possible.

In embodiments that include the light source 120 being a fiber laser, the controller 150 could be operable to dynamically adjust the energy of the emitted light by adjusting at least one of a seed laser parameter (e.g., a seed laser energy) or a pump laser parameter (e.g., a pump laser energy). In some embodiments, the light source 120 could include one or more laser diodes, light-emitting diodes, or other types of light-emitting devices. In an example embodiment, the light source 120 could include InGaAs/GaAs laser diodes configured to emit light at a wavelength around 903 nanometers. In some embodiments, the light source 120 includes at least one of: a laser diode, a laser bar, or a laser stack. Additionally or alternatively, the light source 120 may include one or more master oscillator power amplifier (MOPA) fiber lasers. Such fiber lasers may be configured to provide light pulses at or around 1550 nanometers and may include a seed laser and a length of active optical fiber configured to amplify the seed laser light to higher power levels. However, other types of light-emitting devices, materials, and emission wavelengths are possible and contemplated.

In some embodiments, the light source 120 is configured to emit light into an environment along a plurality of emission vectors toward respective target locations so as to provide a desired resolution. In such scenarios, the light source 120 is operable to emit light along the plurality of emission vectors such that the emitted light interacts with an external environment 160 of the system 100.

Figure 2A:
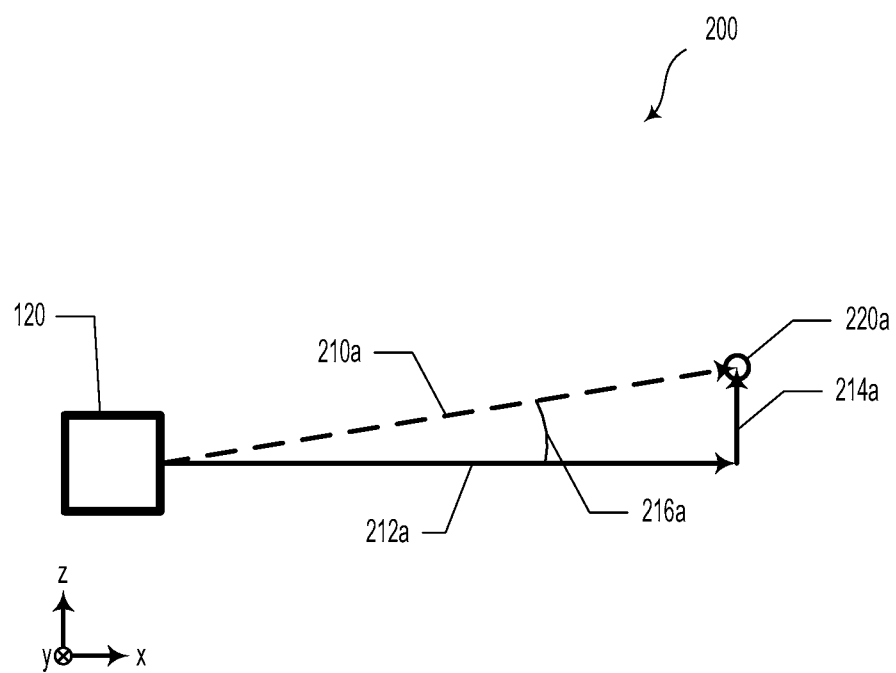
FIG. 2A illustrates a light emission scenario, according to an example embodiment.
Figure 2B:
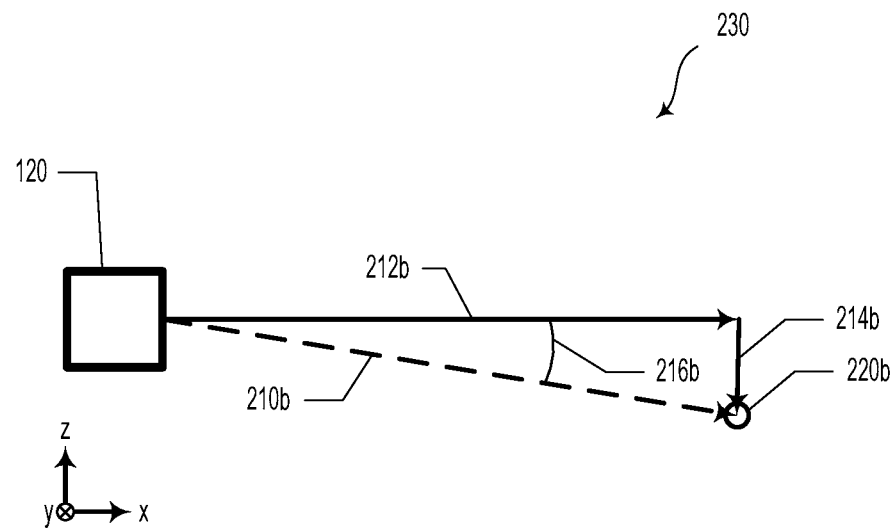
FIG. 2B illustrates a light emission scenario, according to an example embodiment.

FIGS. 2A and 2B illustrate respective light emission scenarios 200 and 230. It will be understood that while FIGS. 2A and 2B include a rectangular coordinate system, other coordinate systems are possible, such as a polar coordinate system. FIG. 2A illustrates a light emission scenario 200, according to example embodiments. Scenario 200 includes a light source 120 emitting light (e.g., light pulses or continuous light radiation) along an emission vector 210a. The emission vector 210a could be directed at a target location 220a in the environment, such as environment 160 of the vehicle 110, as illustrated and described in reference to FIG. 1. Emission vector 210a can be represented as a sum of vectors 212a and 214a.

As illustrated, vector 212a could be the vector projection of emission vector 210a along a direction of travel or a heading of vehicle 110 (illustrated here as being parallel to the x-axis). In such a scenario, vector 214a could include a vector projection of emission vector 210a along an axis perpendicular to the direction of travel or heading of vehicle 110 (illustrated here as being parallel to the z-axis). In some embodiments, vectors 212a and/or 214a could be used to determine an elevation angle component 216a of the emission vector 210a. As illustrated in FIG. 2A, the elevation angle component 216a could include a positive angle value with respect to the x-y plane.

FIG. 2B illustrates a light emission scenario 230, according to example embodiments. Scenario 230 includes a light source 120 emitting light (e.g., light pulses or continuous light radiation) along an emission vector 210b. The emission vector 210b could be directed at a target location 220b in the environment, such as environment 160 of the vehicle 110, as illustrated and described in reference to FIG. 1. Emission vector 210b can be represented as a sum of vectors 212b and 214b.

For example, vector 212b could be the vector projection of emission vector 210b along a direction of travel or a heading of vehicle 110 (illustrated here as being parallel to the x-axis). In such a scenario, vector 214b could include a vector projection of emission vector 210b along an axis perpendicular to the direction of travel or heading of vehicle 110 (illustrated here as being parallel to the z-axis). In some embodiments, vectors 212b and/or 214b could be used to determine an elevation angle component 216b of the emission vector 210b. As illustrated in FIG. 2A, the elevation angle component 216a could include a negative angle value with respect to the x-y plane.

It will be understood that while FIGS. 2A and 2B each illustrate particular light emission scenarios with respective elevation angle components, the light source 120 could emit light in rapidly changing directions and towards various target locations so as to scan the environment 160 of the vehicle 110. Accordingly, the elevation angle could be determined by the controller 150 continuously and dynamically in real-time, or at various times (e.g., periodically and/or in response to determining a target region of interest).

Figure 3:
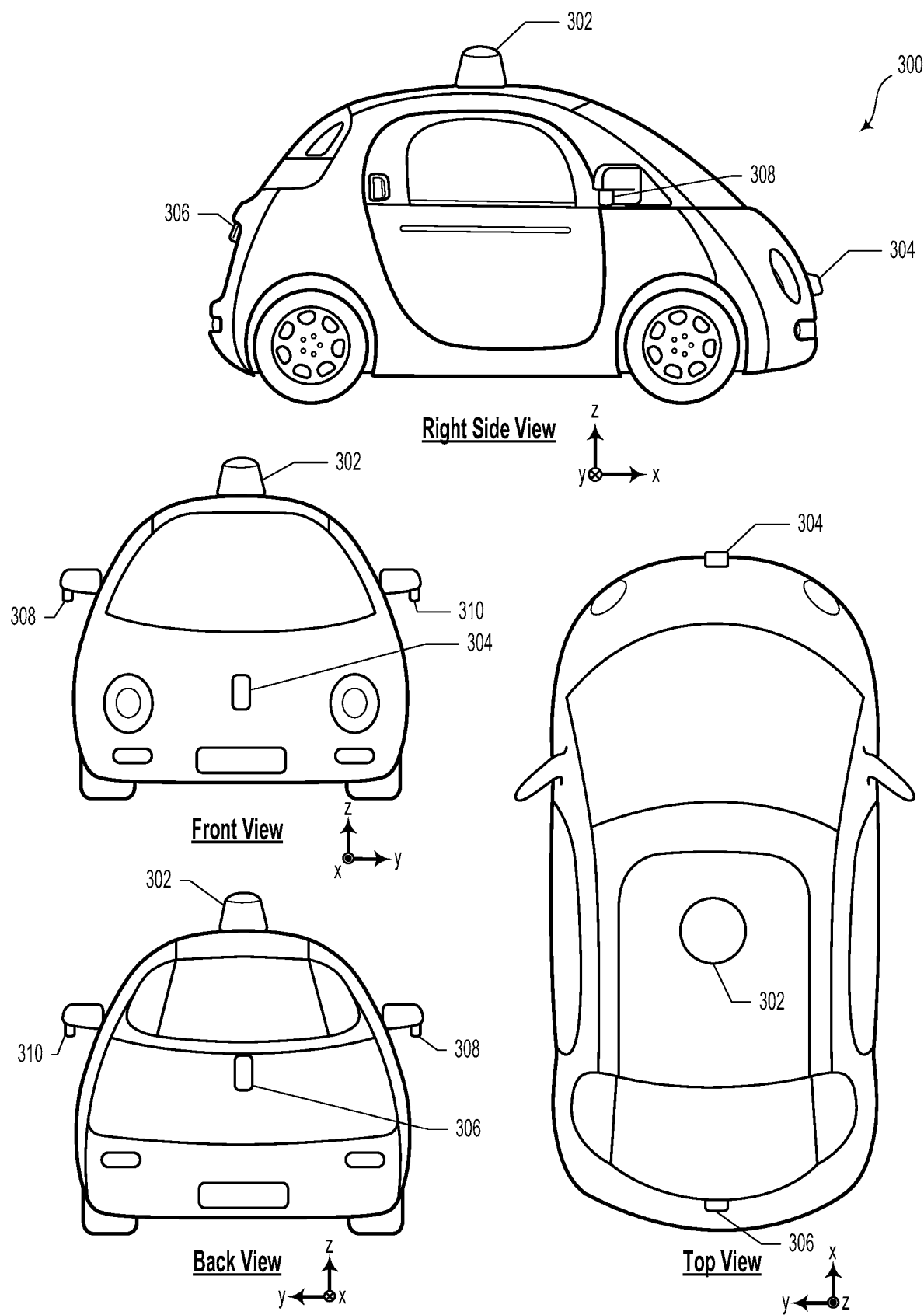
FIG. 3 illustrates a vehicle, according to an example embodiment.

FIG. 3 illustrates a vehicle, according to an example embodiment. The vehicle 300 may include one or more sensor systems 302, 304, 306, 308, and 310. The one or more sensor systems 302, 304, 306, 308, and 310 could be similar or identical to sensor system 410, as illustrated and described below with reference to FIG. 4. As an example, sensor systems 302, 304, 306, 308, and 310 may include transmit block 420. Namely, sensor systems 302, 304, 306, 308, and 310 could include LIDAR sensors having a plurality of light-emitter devices arranged over a range of angles with respect to a given plane (e.g., the x-y plane).

One or more of the sensor systems 302, 304, 306, 308, and 310 may be configured to rotate about an axis (e.g., the z-axis) perpendicular to the given plane so as to illuminate an environment around the vehicle 300 with light pulses. Based on detecting various aspects of reflected light pulses (e.g., the elapsed time of flight, polarization, etc.), information about the environment may be determined.

In an example embodiment, sensor systems 302, 304, 306, 308, and 310 may be configured to provide respective point cloud information that may relate to physical objects within the environment of the vehicle 300. While system 100, vehicle 300 and sensor systems 302 and 304 are illustrated as including certain features, it will be understood that other types of systems are contemplated within the scope of the present disclosure.

An example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle.

While certain description and illustrations herein describe systems with multiple light-emitter devices, LIDAR systems with fewer light-emitter devices (e.g., a single light-emitter device) are also contemplated herein. For example, light pulses emitted by a laser diode may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

Figure 4:
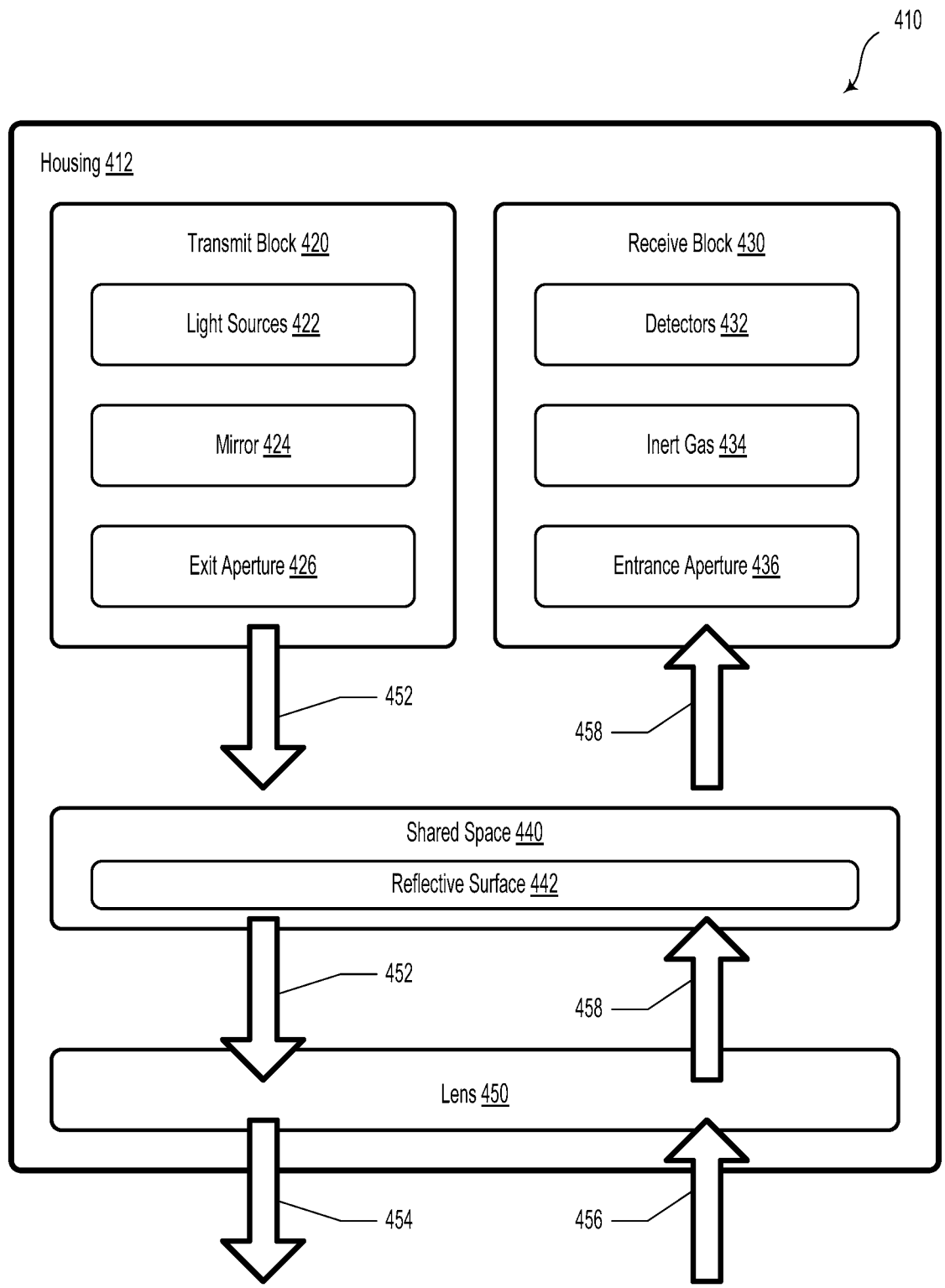
FIG. 4 illustrates a sensing system, according to an example embodiment.

FIG. 4 illustrates a sensing system 410, according to an example embodiment. Sensing system 410 could include some or all of the elements of system 100, as illustrated and described in reference to FIG. 1. The sensing system 410 may be a light detection and ranging (LIDAR) system. The sensing system includes a housing 412 that houses an arrangement of various components, such as a transmit block 420, a receive block 430, a shared space 440, and a lens 450. The sensing system 410 includes an arrangement of components configured to provide emitted light beams 452 from the transmit block 420 that are collimated by the lens 450 and transmitted into an environment of the sensing system 410 as collimated light beams 454. Furthermore, the sensing system 410 includes an arrangement of components configured to collect reflected light 456 from one or more objects in the environment of the sensing system 410 by the lens 450 for focusing towards the receive block 430 as focused light 458. The reflected light 456 includes light from the collimated light beams 454 that was reflected by the one or more objects in the environment of the sensing system 410.

The emitted light beams 452 and focused light 458 may traverse the shared space 440 also included in the housing 410. In some embodiments, the emitted light beams 452 propagate along a transmit path through the shared space 440 and the focused light 458 propagates along a receive path through the shared space 440.

The sensing system 410 can determine an aspect of the one or more objects (e.g., location, shape, etc.) in the environment of the sensing system 410 by processing the focused light 458 received by the receive block 430. For example, the sensing system 410 can compare a time when pulses included in the emitted light beams 452 were emitted by the transmit block 420 with a time when corresponding pulses included in the focused light 458 were received by the receive block 430 and determine the distance between the one or more objects and the sensing system 410 based on the comparison.

The housing 412 included in the sensing system 410 can provide a platform for mounting the various components included in the sensing system 410. The housing 412 can be formed from any material capable of supporting the various components of the sensing system 410 included in an interior space of the housing 412. For example, the housing 412 may be formed from a structural material such as plastic or metal.

In some examples, the housing 412 may include optical shielding configured to reduce ambient light and/or unintentional transmission of the emitted light beams 452 from the transmit block 420 to the receive block 430. The optical shielding can be provided by forming and/or coating the outer surface of the housing 412 with a material that blocks the ambient light from the environment. Additionally, inner surfaces of the housing 412 can include and/or be coated with the material described above to optically isolate the transmit block 420 from the receive block 430 to prevent the receive block 430 from receiving the emitted light beams 452 before the emitted light beams 452 reach the lens 450.

In some examples, the housing 412 can be configured for electromagnetic shielding to reduce electromagnetic noise (e.g., Radio Frequency (RF) Noise, etc.) from ambient environment of the sensor system 410 and/or electromagnetic noise between the transmit block 420 and the receive block 430. Electromagnetic shielding can improve quality of the emitted light beams 452 emitted by the transmit block 420 and reduce noise in signals received and/or provided by the receive block 430. Electromagnetic shielding can be achieved by forming and/or coating the housing 412 with one or more materials such as a metal, metallic ink, metallic foam, carbon foam, or any other material configured to appropriately absorb or reflect electromagnetic radiation. Metals that can be used for the electromagnetic shielding can include for example, copper or nickel.

In some examples, the housing 412 can be configured to have a substantially cylindrical shape and to rotate about an axis of the sensing system 410. For example, the housing 412 can have the substantially cylindrical shape with a diameter of approximately 10 centimeters. In some examples, the axis is substantially vertical. By rotating the housing 412 that includes the various components, in some examples, a three-dimensional map of a 360 degree view of the environment of the sensing system 410 can be determined without frequent recalibration of the arrangement of the various components of the sensing system 410. Additionally or alternatively, the sensing system 410 can be configured to tilt the axis of rotation of the housing 412 to control the field of view of the sensing system 410.

Although not illustrated in FIG. 4, the sensing system 410 can optionally include a mounting structure for the housing 412. The mounting structure can include a motor or other means for rotating the housing 412 about the axis of the sensing system 410. Alternatively, the mounting structure can be included in a device and/or system other than the sensing system 410.

In some examples, the various components of the sensing system 410 such as the transmit block 420, receive block 430, and the lens 450 can be removably mounted to the housing 412 in predetermined positions to reduce burden of calibrating the arrangement of each component and/or sub-components included in each component. Thus, the housing 412 acts as the platform for the various components of the sensing system 410 to provide ease of assembly, maintenance, calibration, and manufacture of the sensing system 410.

The transmit block 420 includes a plurality of light sources 422 that can be configured to emit the plurality of emitted light beams 452 via an exit aperture 426. In some examples, each of the plurality of emitted light beams 452 corresponds to one of the plurality of light sources 422. The transmit block 420 can optionally include a mirror 424 along the transmit path of the emitted light beams 452 between the light sources 422 and the exit aperture 426.

The light sources 422 can include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 452. In some examples, the light sources 422 can be configured to emit the emitted light beams 52 in a wavelength range that can be detected by detectors 432 included in the receive block 430. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately 905 nm. Additionally, the light sources 422 can be configured to emit the emitted light beams 452 in the form of pulses. In some examples, the plurality of light sources 422 can be disposed on one or more substrates (e.g., printed circuit boards (PCB), flexible PCBs, etc.) and arranged to emit the plurality of light beams 452 towards the exit aperture 426.

In some examples, the plurality of light sources 422 can be configured to emit uncollimated light beams included in the emitted light beams 452. For example, the emitted light beams 452 can diverge in one or more directions along the transmit path due to the uncollimated light beams emitted by the plurality of light sources 422. In some examples, vertical and horizontal extents of the emitted light beams 452 at any position along the transmit path can be based on an extent of the divergence of the uncollimated light beams emitted by the plurality of light sources 422.

The exit aperture 426 arranged along the transmit path of the emitted light beams 452 can be configured to accommodate the vertical and horizontal extents of the plurality of light beams 452 emitted by the plurality of light sources 422 at the exit aperture 426. It is noted that the block diagram shown in FIG. 4 is described in connection with functional modules for convenience in description. However, the functional modules in the block diagram of FIG. 4 can be physically implemented in other locations. For example, although illustrated that the exit aperture 426 is included in the transmit block 420, the exit aperture 426 can be physically included in both the transmit block 420 and the shared space 440. For example, the transmit block 420 and the shared space 440 can be separated by a wall that includes the exit aperture 426. In this case, the exit aperture 426 can correspond to a transparent portion of the wall. In one example, the transparent portion can be a hole or cut-away portion of the wall. In another example, the wall can be formed from a transparent substrate (e.g., glass) coated with a non-transparent material, and the exit aperture 426 can be a portion of the substrate that is not coated with the non-transparent material.

In some examples of the sensing system 410, it may be desirable to minimize size of the exit aperture 426 while accommodating the vertical and horizontal extents of the plurality of light beams 452. For example, minimizing the size of the exit aperture 426 can improve the optical shielding of the light sources 422 described above in the functions of the housing 412. Additionally or alternatively, the wall separating the transmit block 420 and the shared space 440 can be arranged along the receive path of the focused light 458, and thus, the exit aperture 426 can be minimized to allow a larger portion of the focused light 458 to reach the wall. For example, the wall can be coated with a reflective material (e.g., reflective surface 442 in shared space 440) and the receive path can include reflecting the focused light 458 by the reflective material towards the receive block 430. In this case, minimizing the size of the exit aperture 426 can allow a larger portion of the focused light 458 to reflect off the reflective material with which the wall is coated.

To minimize the size of the exit aperture 426, in some examples, the divergence of the emitted light beams 452 can be reduced by partially collimating the uncollimated light beams emitted by the light sources 422 to minimize the vertical and horizontal extents of the emitted light beams 452 and thus minimize the size of the exit aperture 426. For example, each light source of the plurality of light sources 422 can include a cylindrical lens arranged adjacent to the light source. The light source may emit a corresponding uncollimated light beam that diverges more in a first direction than in a second direction. The cylindrical lens may pre-collimate the uncollimated light beam in the first direction to provide a partially collimated light beam, thereby reducing the divergence in the first direction. In some examples, the partially collimated light beam diverges less in the first direction than in the second direction. Similarly, uncollimated light beams from other light sources of the plurality of light sources 422 can have a reduced beam width in the first direction and thus the emitted light beams 452 can have a smaller divergence due to the partially collimated light beams. In this example, at least one of the vertical and horizontal extents of the exit aperture 426 can be reduced due to partially collimating the light beams 452.

Additionally or alternatively, to minimize the size of the exit aperture 426, in some examples, the light sources 422 can be arranged along a shaped surface defined by the transmit block 420. In some examples, the shaped surface may be faceted and/or substantially curved. The faceted and/or curved surface can be configured such that the emitted light beams 452 converge towards the exit aperture 426, and thus the vertical and horizontal extents of the emitted light beams 452 at the exit aperture 426 can be reduced due to the arrangement of the light sources 422 along the faceted and/or curved surface of the transmit block 420.

In some examples, a curved surface of the transmit block 420 can include a curvature along the first direction of divergence of the emitted light beams 452 and a curvature along the second direction of divergence of the emitted light beams 452, such that the plurality of light beams 452 converge towards a central area in front of the plurality of light sources 422 along the transmit path.

To facilitate such curved arrangement of the light sources 422, in some examples, the light sources 422 can be disposed on a flexible substrate (e.g., flexible PCB) having a curvature along one or more directions. For example, the curved flexible substrate can be curved along the first direction of divergence of the emitted light beams 452 and the second direction of divergence of the emitted light beams 452. Additionally or alternatively, to facilitate such curved arrangement of the light sources 422, in some examples, the light sources 422 can be disposed on a curved edge of one or more vertically-oriented printed circuit boards (PCBs), such that the curved edge of the PCB substantially matches the curvature of the first direction (e.g., the vertical plane of the PCB). In this example, the one or more PCBs can be mounted in the transmit block 420 along a horizontal curvature that substantially matches the curvature of the second direction (e.g., the horizontal plane of the one or more PCBs). For example, the transmit block 420 can include four PCBs, with each PCB mounting sixteen light sources, so as to provide 64 light sources along the curved surface of the transmit block 420. In this example, the 64 light sources are arranged in a pattern such that the emitted light beams 452 converge towards the exit aperture 426 of the transmit block 420.

The transmit block 420 can optionally include the mirror 424 along the transmit path of the emitted light beams 452 between the light sources 422 and the exit aperture 426. By including the mirror 424 in the transmit block 420, the transmit path of the emitted light beams 452 can be folded to provide a smaller size of the transmit block 420 and the housing 412 of the sensing system 410 than a size of another transmit block where the transmit path that is not folded.

The receive block 430 includes a plurality of detectors 432 that can be configured to receive the focused light 458 via an entrance aperture 436. In some examples, each of the plurality of detectors 432 is configured and arranged to receive a portion of the focused light 458 corresponding to a light beam emitted by a corresponding light source of the plurality of light sources 422 and reflected of the one or more objects in the environment of the sensing system 410. The receive block 430 can optionally include the detectors 432 in a sealed environment having an inert gas 434.

The detectors 432 may comprise photodiodes, avalanche photodiodes, single-photon avalanche diodes (SPADs), phototransistors, silicon photomultipliers (SiPMs), cameras, active pixel sensors (APS), charge coupled devices (CCD), cryogenic detectors, or any other sensor of light configured to receive focused light 458 having wavelengths in the wavelength range of the emitted light beams 452.

To facilitate receiving, by each of the detectors 432, the portion of the focused light 58 from the corresponding light source of the plurality of light sources 422, the detectors 432 can be disposed on one or more substrates and arranged accordingly. For example, the light sources 422 can be arranged along a curved surface of the transmit block 420. Detectors 432 can be arranged along a curved surface of the receive block 430. In some embodiments, the curved surface of the receive block 430 may include a similar or identical curved surface as that of transmit block 420. Thus, each of the detectors 432 may be configured to receive light that was originally emitted by a corresponding light source of the plurality of light sources 422.

To provide the curved surface of the receive block 430, the detectors 432 can be disposed on the one or more substrates similarly to the light sources 422 disposed in the transmit block 420. For example, the detectors 432 can be disposed on a flexible substrate (e.g., flexible PCB) and arranged along the curved surface of the flexible substrate to each receive focused light originating from a corresponding light source of the light sources 422. In this example, the flexible substrate may be held between two clamping pieces that have surfaces corresponding to the shape of the curved surface of the receive block 430. Thus, in this example, assembly of the receive block 430 can be simplified by sliding the flexible substrate onto the receive block 430 and using the two clamping pieces to hold it at the correct curvature.

The focused light 458 traversing along the receive path can be received by the detectors 432 via the entrance aperture 436. In some examples, the entrance aperture 436 can include a filtering window that passes light having wavelengths within the wavelength range emitted by the plurality of light sources 422 and attenuates light having other wavelengths. In this example, the detectors 432 receive the focused light 458 substantially comprising light having the wavelengths within the wavelength range.

In some examples, the plurality of detectors 432 included in the receive block 430 can include, for example, avalanche photodiodes in a sealed environment that is filled with the inert gas 434. The inert gas 434 may comprise, for example, nitrogen.

The shared space 440 includes the transmit path for the emitted light beams 452 from the transmit block 420 to the lens 450, and includes the receive path for the focused light 458 from the lens 450 to the receive block 430. In some examples, the transmit path at least partially overlaps with the receive path in the shared space 440. By including the transmit path and the receive path in the shared space 440, advantages with respect to size, cost, and/or complexity of assembly, manufacture, and/or maintenance of the sensing system 410 can be provided.

While the exit aperture 426 and the entrance aperture 436 are illustrated as being part of the transmit block 420 and the receive block 430, respectively, it is understood that such apertures may be arranged or placed at other locations. In some embodiments, the function and structure of the exit aperture 426 and the entrance aperture 436 may be combined. For example, the shared space 440 may include a shared entrance/exit aperture. It will be understood that other ways to arrange the optical components of system 410 within housing 412 are possible and contemplated.

In some examples, the shared space 40 can include a reflective surface 442. The reflective surface 442 can be arranged along the receive path and configured to reflect the focused light 458 towards the entrance aperture 436 and onto the detectors 432. The reflective surface 442 may comprise a prism, mirror or any other optical element configured to reflect the focused light 458 towards the entrance aperture 436 in the receive block 430. In some examples, a wall may separate the shared space 440 from the transmit block 420. In these examples, the wall may comprise a transparent substrate (e.g., glass) and the reflective surface 442 may comprise a reflective coating on the wall with an uncoated portion for the exit aperture 426.

In embodiments including the reflective surface 442, the reflective surface 442 can reduce size of the shared space 440 by folding the receive path similarly to the mirror 424 in the transmit block 420. Additionally or alternatively, in some examples, the reflective surface 442 can direct the focused light 458 to the receive block 430 further providing flexibility to the placement of the receive block 430 in the housing 412. For example, varying the tilt of the reflective surface 442 can cause the focused light 458 to be reflected to various portions of the interior space of the housing 412, and thus the receive block 430 can be placed in a corresponding position in the housing 412. Additionally or alternatively, in this example, the sensing system 10 can be calibrated by varying the tilt of the reflective surface 442.

The lens 450 mounted to the housing 412 can have an optical power to both collimate the emitted light beams 452 from the light sources 422 in the transmit block 420, and focus the reflected light 456 from the one or more objects in the environment of the sensing system 410 onto the detectors 432 in the receive block 430. In one example, the lens 450 has a focal length of approximately 120 mm. By using the same lens 450 to perform both of these functions, instead of a transmit lens for collimating and a receive lens for focusing, advantages with respect to size, cost, and/or complexity can be provided. In some examples, collimating the emitted light beams 452 to provide the collimated light beams 454 allows determining the distance travelled by the collimated light beams 454 to the one or more objects in the environment of the sensing system 10.

While, as described herein, lens 450 is utilized as a transmit lens and a receive lens, it will be understood that separate lens and/or other optical elements are contemplated within the scope of the present disclosure. For example, lens 450 could represent distinct lenses or lens sets along discrete optical transmit and receive paths.

In an example scenario, the emitted light beams 452 from the light sources 422 traversing along the transmit path can be collimated by the lens 450 to provide the collimated light beams 454 to the environment of the sensing system 410. The collimated light beams 454 may then reflect off the one or more objects in the environment of the sensing system 410 and return to the lens 450 as the reflected light 456. The lens 450 may then collect and focus the reflected light 456 as the focused light 458 onto the detectors 432 included in the receive block 30. In some examples, aspects of the one or more objects in the environment of the sensing system 410 can be determined by comparing the emitted light beams 452 with the focused light beams 58. The aspects can include, for example, distance, shape, color, and/or material of the one or more objects. Additionally, in some examples, by rotating the housing 412, a three-dimensional map of the surroundings of the sensing system 410 can be determined.

In some examples where the plurality of light sources 422 are arranged along a curved surface of the transmit block 420, the lens 450 can be configured to have a focal surface corresponding to the curved surface of the transmit block 420. For example, the lens 450 can include an aspheric surface outside the housing 412 and a toroidal surface inside the housing 412 facing the shared space 440. In this example, the shape of the lens 450 allows the lens 450 to both collimate the emitted light beams 452 and focus the reflected light 456. Additionally, in this example, the shape of the lens 450 allows the lens 450 to have the focal surface corresponding to the curved surface of the transmit block 420. In some examples, the focal surface provided by the lens 450 substantially matches the curved shape of the transmit block 420. Additionally, in some examples, the detectors 432 can be arranged similarly in the curved shape of the receive block 430 to receive the focused light 458 along the curved focal surface provided by the lens 450. Thus, in some examples, the curved surface of the receive block 430 may also substantially match the curved focal surface provided by the lens 450.

Figure 5A:
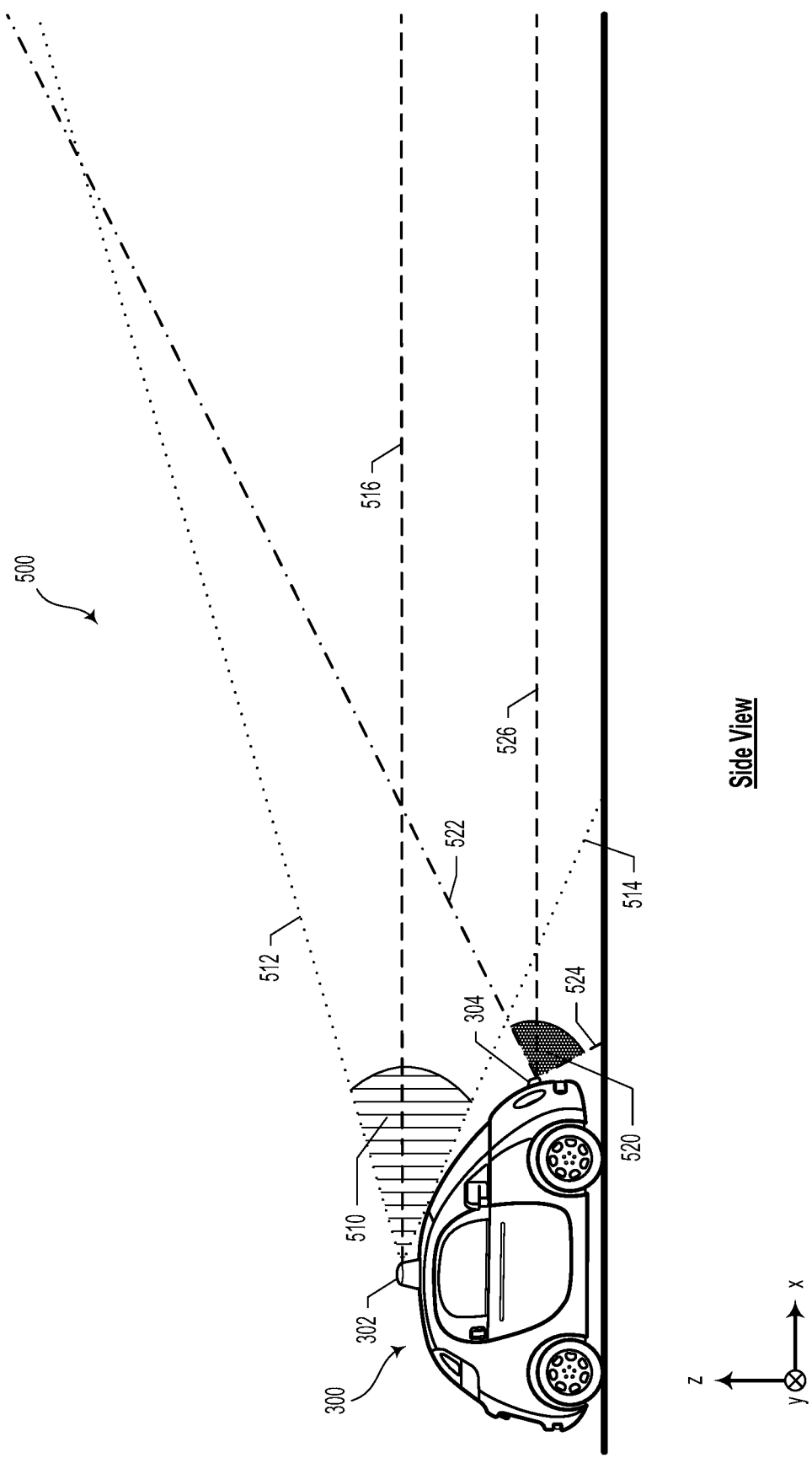
FIG. 5A illustrates a sensing scenario, according to an example embodiment.

FIGS. 5A-5D illustrate several views of various sensing scenarios involving a vehicle and one or more sensor systems. FIG. 5A illustrates a side view of vehicle 300 in a sensing scenario 500, according to an example embodiment. In such a scenario, sensor system 302 may be configured to emit light pulses into an environment of the vehicle 300 over an elevation angle range 510 between a maximum elevation angle 512 and a minimum elevation angle 514. In some embodiments, sensor system 302 may include a light source (e.g., a fiber laser) configured to emit light into the environment of vehicle 300 within an adjustable scanning region.

Additionally or alternatively, sensor system 302 may include a plurality of light-emitter devices that are arranged in a non-linear elevation angle distribution. That is, to achieve a desired vertical beam resolution, the plurality of light-emitter devices of sensor system 302 may be arranged over beam elevation angles that include heterogeneous elevation angle differences between adjacent beams.

In example embodiments, light emitted from sensor system 302 with an elevation angle component below a threshold angle or plane (e.g., a horizontal plane corresponding to axis 516) could be provided at a first energy. In such a scenario, light emitted from sensor system 302 with an elevation angle component above the threshold angle or plane could be provided at a second energy that could be higher or lower than that of the first energy.

As a further example, sensor system 304 may be configured to emit light pulses into an environment of the vehicle 300 over an elevation angle range 520, which may be defined between a maximum elevation angle 522 and a minimum elevation angle 524. In some embodiments, one or more light-emitter devices of sensor system 304 may illuminate the environment about the vehicle 300 by reflecting light from a spinning mirror (e.g., a prism mirror).

In such example embodiments, a controller (e.g., controller 150 as illustrated and described in reference to FIG. 1) could determine an elevation angle component of the emission vector of the light pulses or continuous light beam and dynamically adjust an energy of the emitted light based on the determined elevation angle component.

In example embodiments, light emitted from sensor system 304 with an elevation angle component below a threshold angle or plane (e.g., a horizontal plane corresponding to axis 526 and/or the "ground-skimming" beam elevation angle 594 as described with reference to FIG. 5C) could be provided at a first energy (e.g., 1 microjoule). In such a scenario, light emitted from sensor system 302 with an elevation angle component above the threshold angle or plane could be provided at a second energy (e.g., 100 nanojoules). It will be understood that the first and second energy values could be higher or lower that the values described herein.

Figure 5B:
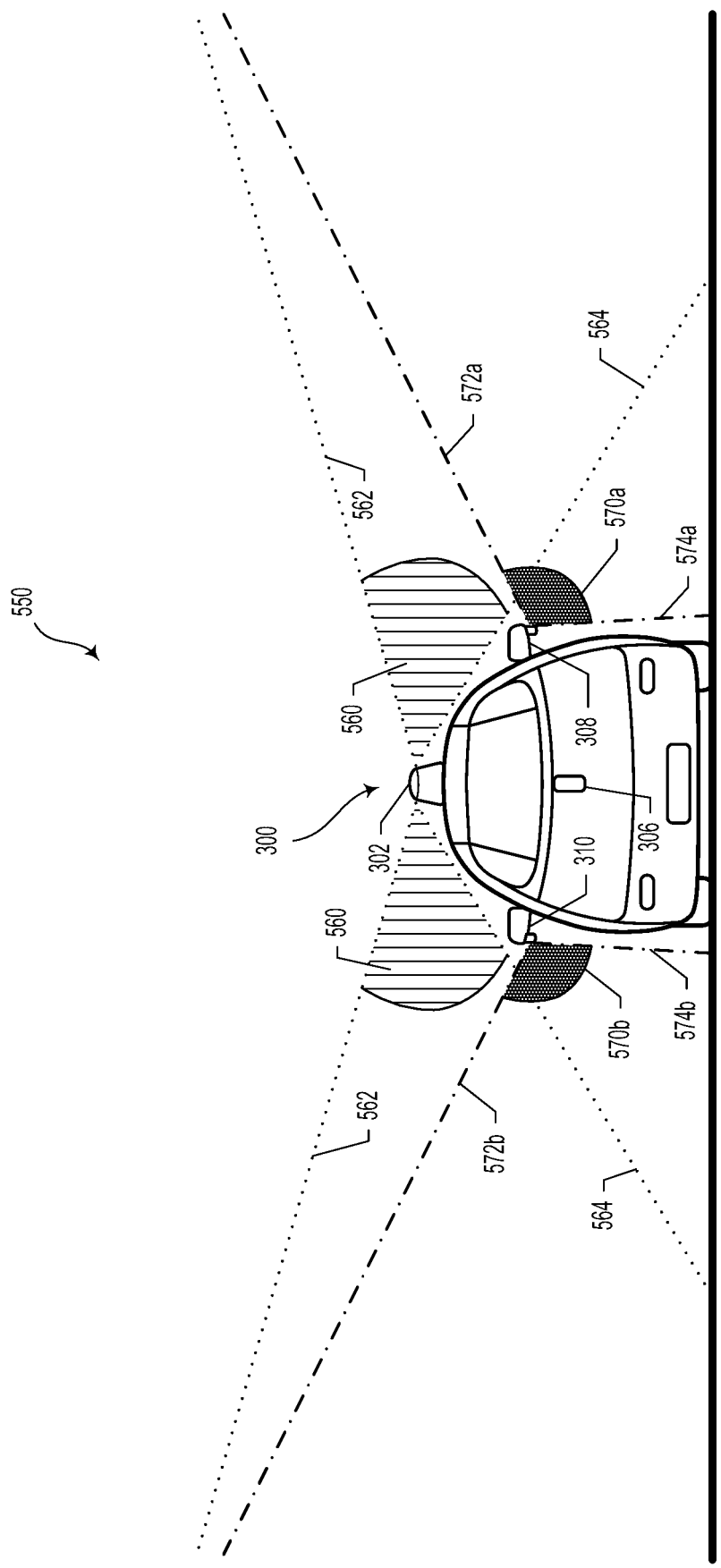
FIG. 5B illustrates a sensing scenario, according to an example embodiment.

FIG. 5B illustrates a back view of vehicle 300 in a sensing scenario 550. As illustrated in sensing scenario 550, the sensor systems 302, 308 and 310 may be configured to detect objects over an elevation angle range 560 having a maximum elevation angle 562 and a minimum elevation angle 564. Similarly, sensor systems 308 and 310 may provide respective elevation angle ranges 570*a* and 570*b*, which may be bounded by respective maximum elevation angles 572*a* and 572*b* and respective minimum elevation angles 574*a* and 574*b*.

Example embodiments may include adjusting various aspects of an emitted light pulse (e.g. pulse energy) based on a changing environment around the vehicle as it moves around the world. Specifically, aspects of the emitted light pulses may be varied based on, without limitation, an undulating roadway (e.g., grade changes when driving uphill or downhill, driving around a curve, etc.), objects on or adjacent to the roadway (e.g., pedestrians, other vehicles, buildings, etc.), or other static or dynamically-varying environmental conditions or contexts.

Figure 5C:
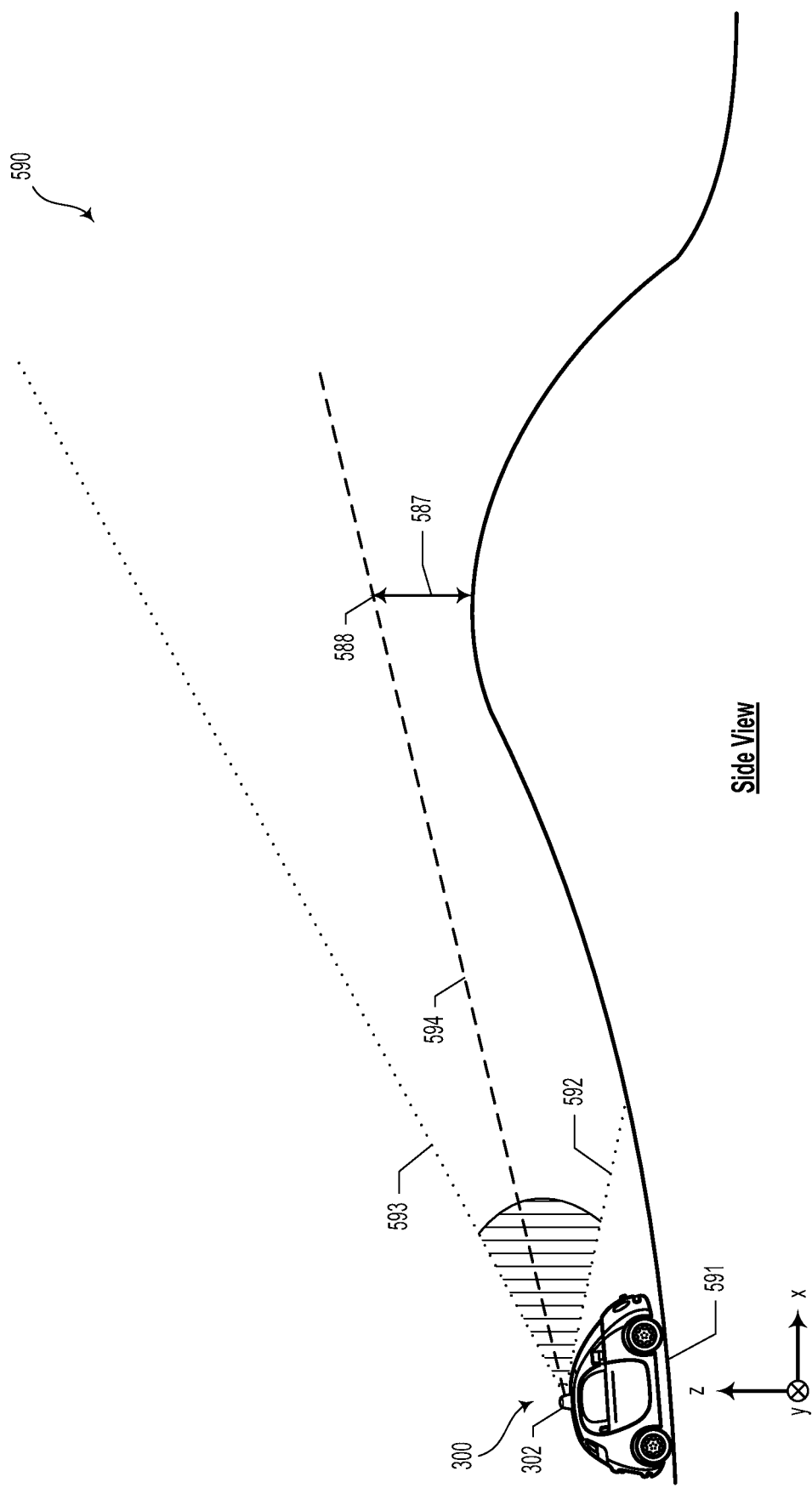
FIG. 5C illustrates a sensing scenario, according to an example embodiment.

FIG. 5C illustrates a sensing scenario 590, according to an example embodiment. Vehicle 300 may be in contact with an uphill roadway surface 591. In such a scenario, objects of interest for sensing may include other vehicles in contact with the same roadway surface 591 (e.g., oncoming traffic over the hill). Such objects and/or other vehicles, which may interfere with a vehicle path of travel, could be between 0 to 4 meters above the roadway surface 591. As such, while sensor 302 may be operable to sense objects between a minimum beam elevation angle 592 to a maximum beam elevation angle 593, in some embodiments, data obtained between the minimum beam elevation angle 592 and a dynamically-changing "ground-skimming" beam elevation angle 594 may be designated as being more important or as having a higher priority in an effort to detect other vehicles and objects along the undulating roadway surface 491. The "ground-skimming" beam elevation angle 594 could be dynamically defined as a scanning angle that corresponds to a specific location 588, which may be at a predetermined height 587 above the roadway and a predetermined distance away from the vehicle 300. In an example embodiment, the specific location 588 could be about 60 meters from the vehicle 300 and predetermined height 587 could be approximately 4 meters above the roadway surface 591.

In some embodiments and under some conditions, systems and methods described herein need not always scan the entire range of possible beam elevation angles (e.g., angles between an entire angle range between minimum beam elevation angle 592 and the maximum beam elevation angle 593). Instead, the beam-scanning range, scan rate, scan resolution, and beam energy (among other characteristics of the emitted light) may be varied based on the dynamically-changing yaw-dependent contours of the roadway and/or other portions of the environment around the vehicle 300.

For example, in some scenarios, the beam elevation angles between the "ground-skimming" beam elevation angle 594 and the maximum beam elevation angle 593 need not be scanned at all. That is, for a given yaw angle, light pulses need not be emitted into elevation ranges that might be predicted to not include objects that might interfere with progress of the vehicle 300. Additionally or alternatively, the light pulses could be emitted into those angle ranges could be shortened, provided at lower energy, and/or eliminated altogether.

Furthermore, for the light pulses that are emitted into the angles between the minimum beam elevation angle 592 and the "ground-skimming" beam elevation angle 594, certain aspects of the emitted light could be adjusted in an effort to increase the likelihood that objects on or close to the ground will be detected. For example, in some scenarios, the per pulse energy and/or the continuous beam energy could be increased so as to increase a potential return signal from objects present within that angle range.

In some embodiments, systems and methods described herein may include adjusting an emission energy of light emitted from various sensor systems based on a contour line that extends around the vehicle (e.g., through 360 degrees or a plurality of yaw angles) and may be defined as a substantially continuous line that is located at a predetermined distance away from the vehicle 300 (e.g., 60, 100, or 200 meters away) and/or at a predetermined height above a ground surface. Such a contour line may be dynamically adjusted as the vehicle 300 moves around its environment. The contour line could be determined based on a topographic map or current or prior point cloud information obtained by the vehicle 300 and/or other vehicles. In some embodiments, the contour line could pass through one or more specific locations on or above the ground, such as location 588 shown in FIG. 5C or location 589 shown in FIG. 5D.

For example, consider a scenario where the contour line represents a predetermined height of one meter from the ground at 60 meters distance from the vehicle 300. When the vehicle 300 is on level terrain with no objects at one meter from the ground, the contour line could be represented by a two-dimensional circle with 60 meter radius that is centered on the vehicle. However, when the vehicle 300 encounters hilly terrain and/or objects at one meter from the ground, the contour line could include a three-dimensional circle, oval, or irregular shape based on dynamically changing topographical features and/or object data. In some embodiments, the energy of emitted light could be dynamically adjusted based on a shape of the contour line.

Figure 5D:
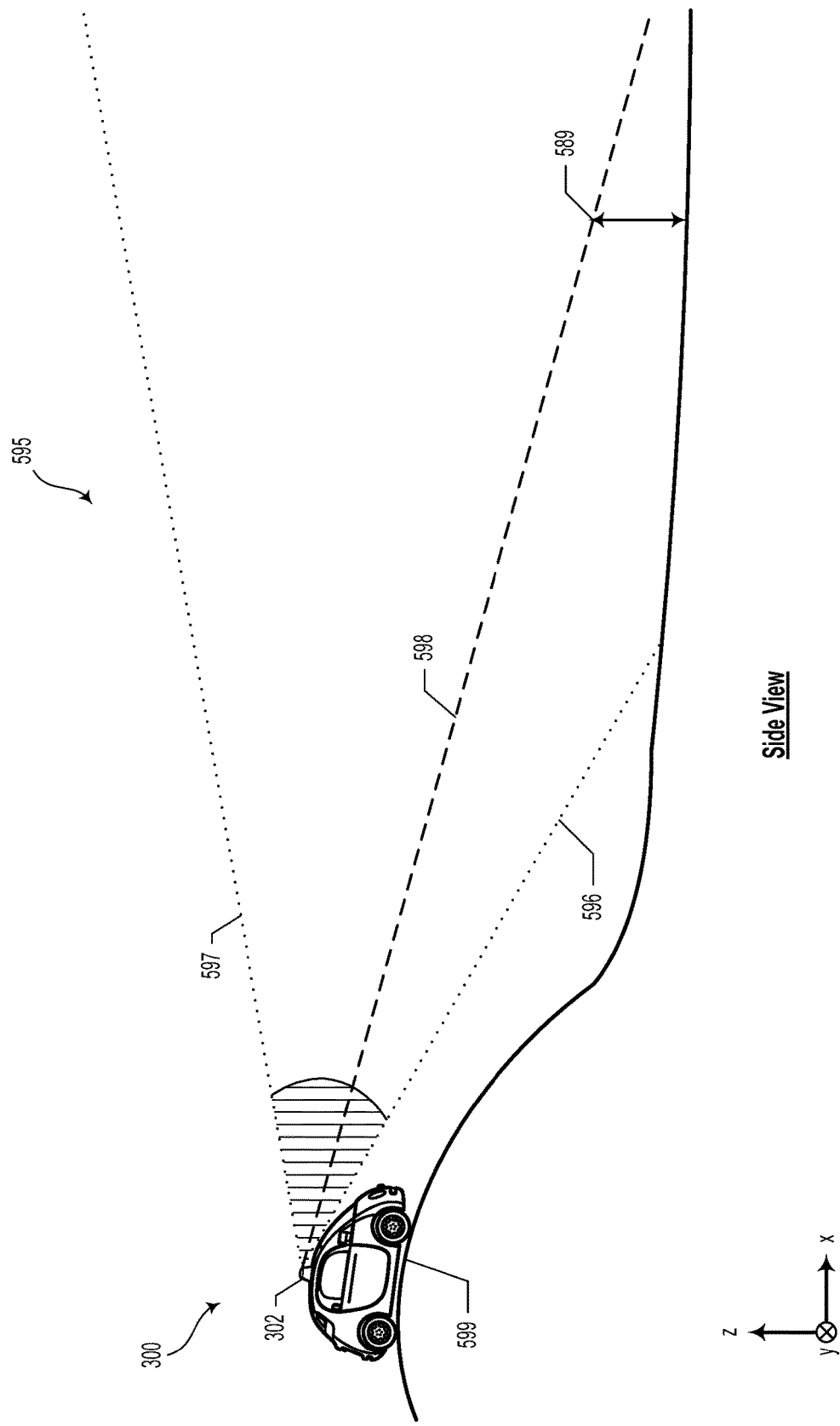
FIG. 5D illustrates a sensing scenario, according to an example embodiment.

FIG. 5D illustrates a sensing scenario 595, according to an example embodiment. Vehicle 300 may be in contact with a downhill roadway surface 599. As described above with reference to FIG. 4E, some beam angles of sensor 302 may be "prioritized" over others. For example, a "ground-skimming" beam elevation angle 598 may dynamically change based on a specific location 589 (which may be defined for each yaw angle) that corresponds to a predetermined distance away from the vehicle 300 and a predetermined height about a ground surface. A range of beam angle elevations between the "ground-skimming" beam elevation angle 598 and minimum beam elevation angle 596 may be prioritized over other beam elevations (e.g., beam elevation angles between the "ground-skimming" beam elevation angle 598 and the maximum beam elevation angle 597).

As described above, in some embodiments, light pulses need not be emitted into beam elevation angles above the "ground-skimming" beam elevation angle 598. Additionally or alternatively, the per pulse energy for light pulses emitted into such an elevation angle range may be reduced or eliminated altogether. Other distinctions between transmission and reception of light pulses into yaw-dependent beam angles ranges are possible based on, for instance, a topographic map, point cloud information, or other knowledge about objects and/or ground surfaces within an environment of the vehicle 300. In some embodiments, the point cloud information may be gathered by a vehicle utilizing the LIDAR system (from a previous scan earlier in the drive and/or from a scan from a prior drive of the vehicle along the same route) or another vehicle utilizing a LIDAR system. The other vehicle could be part of a common fleet of vehicles or could be associated with a different fleet.

III. Example Methods

Figure 6:
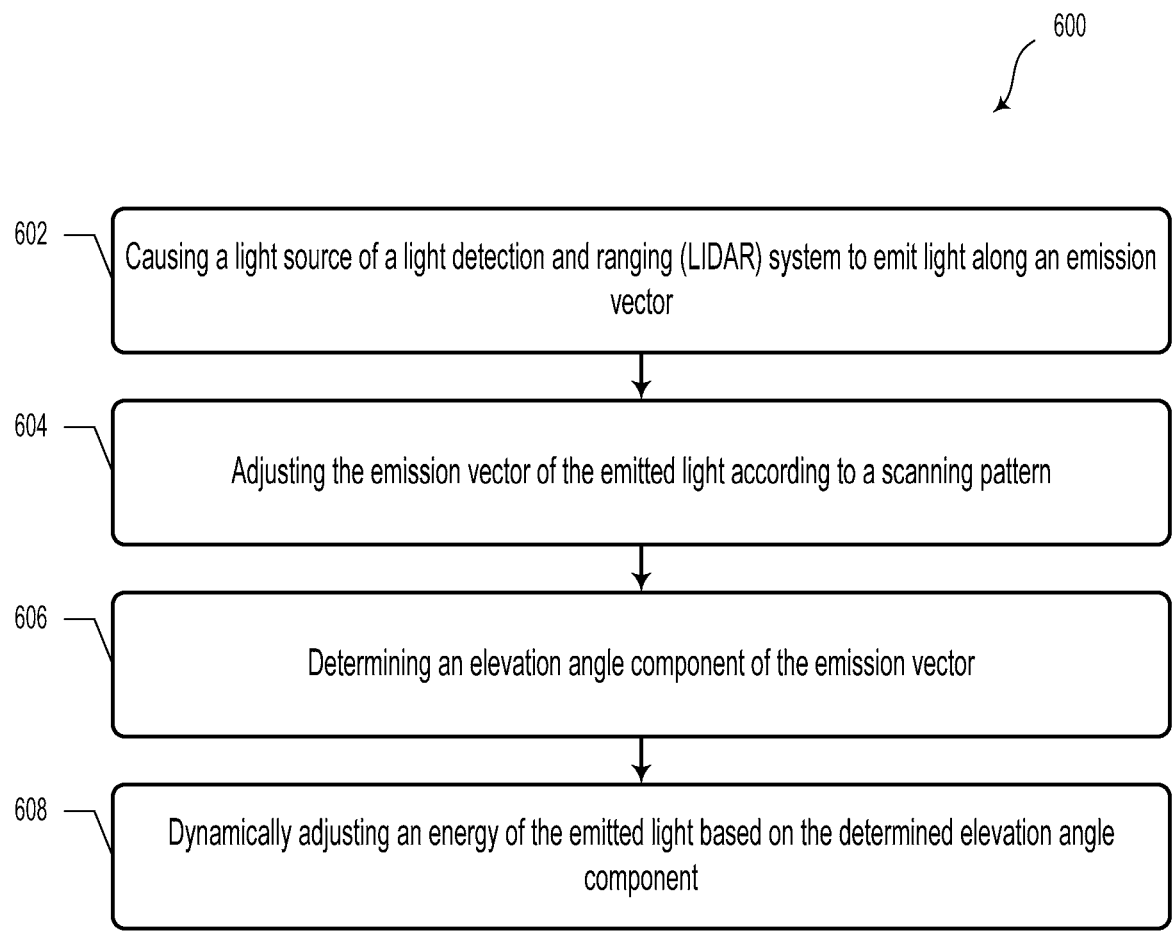
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may be carried out by controller 150 as illustrated and described in relation to FIG. 1.

Block 602 includes causing a light source of a light detection and ranging (LIDAR) system to emit light along an emission vector. In some embodiments, block 602 could include causing the light source to emit a plurality of light pulses. In example embodiments, a pulse length of at least one light pulse of the plurality of light pulses could be within a range between 10 picoseconds to 10 nanoseconds. It will be understood that other pulse lengths are possible and contemplated.

Block 604 include adjusting the emission vector of the emitted light according to a scanning pattern. As an example, adjusting the emission vector of the emitted light could include adjusting a mechanical mirror of the LIDAR system that interacts with the emitted light. By adjusting the mechanical mirror, the emission vector of the emitted light can be changed with respect to an external environment of the LIDAR system. Additionally or alternatively, adjusting the emission vector could include adjusting another type of optical element (e.g., a lens, an aperture, etc.). The emission vector could be adjusted according to a scanning path, a desired spatial resolution, and/or a region of interest, among other possibilities.

Block 606 includes determining an elevation angle component of the emission vector. As described herein, determining the elevation angle component could include determining a vector projection of the emission vector onto a reference axis or reference plane (e.g., a horizontal plane). Additionally or alternatively, determining the elevation angle component could include querying a lookup table that provides the elevation angle component based on, for instance, a current position of a mechanical mirror, a mounting position of a given light source, a current position within a predetermined scanning pattern within a field of view, a pose of a vehicle (e.g., uphill or downhill angle of vehicle), among other possibilities. In such a scenario, the lookup table could be stored in memory 154, as illustrated and described with reference to FIG. 1. Additionally or alternatively, the lookup table could be stored elsewhere (e.g., at a cloud server or another location).

Block 608 includes dynamically adjusting an energy of the emitted light based on the determined elevation angle component. Block 608 could include adjusting a pulse energy of at least one light pulse of the plurality of light pulses. For example, the pulse energy of at least one light pulse could be between 10 nanojoules and 10 microjoules. In some scenarios, the energy of the emitted light could be adjusted so as to account for different predicted values of the range to a target object. For example, light emitted from a vehicle-mounted LIDAR with a negative elevation angle component (e.g., a substantially downward-pointing beam) could be anticipated to interact with a ground surface or another object along the ground surface. As such, the energy of the emitted light provided at such elevation angles need not be as high as other elevation angles, such as those corresponding to "ground-skimming" angles and other elevation angles with longer predicted ranges to a target object.

In some embodiments, dynamically adjusting the energy of the emitted light could be further based on a laser safety standard. For example, the laser safety standard could include the American National Standard for Safe Use of Lasers (ANSI Z136.1-2014) or other international laser safety standards. As an example, the laser safety standard could include standards established by the International Electrotechnical Commission (IEC), such as IEC 60825-1 and/or IEC 60601-2-22, and other similar standards. In some cases, the laser safety standard could include recommended and/or required thresholds for optical energy emitted into a particular area for a given time and at a given wavelength. Such laser safety standards could specifically be provided over the IR-A (~800-1400 nanometers) and IR-B (~1400-3000 nanometers) wavelength ranges. However, other wavelength ranges are possible and contemplated.

Additionally or alternatively, dynamically adjusting the energy of the emitted light could be based on another type of laser safety program or standard, even if not current established, such as an autonomous vehicle laser safety program or standard.

The applicable laser safety standards could be incorporated into system and methods herein by setting minimum or maximum dwell times, dose limits, energy per pulse, mechanical slew rates, and other limitations so as to conform to the applicable laser safety standard.

Furthermore, dynamically adjusting the energy of the emitted light could be based on a class of the light source (e.g., Class 2 laser, Class 3B laser, etc.), time of day, whether pedestrians are present, urban/rural locale, enclosed/open roadway, vehicle speed, vehicle density, among other possibilities.

Additionally or alternatively, in some embodiments where the LIDAR system is coupled to a vehicle, the method 600 could include dynamically adjusting the energy of the emitted light is further based on at least one of: point cloud data, map data, image data, object data, retroreflector location data, time of day, ambient light condition, sun position, a pose of the vehicle, a heading of the vehicle, or an operating condition of the vehicle.

In some embodiments, a pulse repetition rate of at least a portion of the plurality of light pulses could be between 50 kilohertz and 1 megahertz. Other pulse repetition rates are possible and contemplated.

In some scenarios, the light source includes a fiber laser operable to emit light having a wavelength of 905 nanometers or 1550 nanometers. In such scenarios, dynamically adjusting the energy of the emitted light could include adjusting at least one of a seed laser operating parameter or a pump laser operating parameter. As a specific example, for a laser emitting light at a wavelength of 1550 nanometers, a maximum energy limit of 5 µJ provided to a target area of 7 mm$^2$ corresponding to a maximum optical power of about 40 milliwatts could be established (e.g., based on a laser safety standard). In such a scenario, the light source could be controlled such that light emitted into the environment remains below the maximum energy limit. To achieve this, a mechanical mirror and/or a rotational mount could be moved so that the emitted light does not dwell on a given location for longer than a threshold time. Additionally or alternatively, a pulser circuit or a power supply could be adjusted such that the light source emits less than 200 nJ at 905 nanometers toward a given location. It will be understood that other scenarios, wavelengths, and maximum energy limits are possible and contemplated.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a vehicle;
   a light source coupled to the vehicle, wherein the light source is configured to emit at least one light pulse toward an environment of the vehicle; and
   a controller operable to:
      determine an emission vector of the at least one light pulse;
      determine an elevation angle component of the emission vector;
      dynamically determine a ground-skimming beam elevation angle based on a predetermined height above a roadway at a predetermined distance away from the vehicle;
      compare the elevation angle component to the ground-skimming beam elevation angle; and
      dynamically adjust a per pulse energy of at least one subsequent light pulse based on the comparison.

2. The system of claim 1, wherein the light source is configured to emit light in a scanning pattern.

3. The system of claim 2, wherein the controller is further operable to adjust the emission vector of the at least one subsequent light pulse according to the scanning pattern.

4. The system of claim 1, wherein the controller is operable to dynamically adjust the per pulse energy of the at least one subsequent light pulse further based on at least one of: point cloud data, map data, image data, object data, retroreflector location data, time of day, ambient light condition, sun position, a pose of the vehicle, a heading of the vehicle, or an operating condition of the vehicle.

5. The system of claim 1, further comprising a light detection and ranging (LIDAR) system, wherein the light source is an element of the LIDAR system.

6. The system of claim 1, wherein the at least one subsequent light pulse comprises a plurality of light pulses.

7. The system of claim 6, wherein the controller is operable to dynamically adjust a per pulse energy of at least one light pulse of the plurality of light pulses, wherein the pulse energy of at least one light pulse is between 10 nanojoules and 10 microjoules.

8. The system of claim 6, wherein a pulse repetition rate of at least a portion of the plurality of light pulses is between 50 kilohertz and 1 megahertz.

9. The system of claim 1, wherein the light source comprises a fiber laser operable to emit light pulses having a wavelength of 905 nanometers or 1550 nanometers.

10. The system of claim 9, wherein the controller is operable to dynamically adjust the per pulse energy of the at least one subsequent light pulse by adjusting at least one of a seed laser parameter or a pump laser parameter.

11. A method comprising:
   determining an emission vector of a light pulse emitted by a light source of a light detection and ranging (LIDAR) system;
   determining an elevation angle component of the emission vector;
   dynamically determining a ground-skimming beam elevation angle based on a predetermined height above a roadway at a predetermined distance away from the vehicle;
   comparing the elevation angle component to the ground-skimming beam elevation angle; and
   dynamically adjusting a per pulse energy of at least one subsequent light pulse emitted by the light source based on the comparison.

12. The method of claim 11, wherein the LIDAR system is coupled to a vehicle, wherein dynamically adjusting the per pulse energy of the at least one subsequent light pulse is further based on at least one of: point cloud data, map data, image data, object data, retroreflector location data, time of day, ambient light condition, sun position, a pose of the vehicle, a heading of the vehicle, or an operating condition of the vehicle.

13. The method of claim 11, further comprises causing the light source to emit a plurality of light pulses.

14. The method of claim 13, wherein dynamically adjusting a per pulse energy of the at least one subsequent light pulse comprises adjusting a pulse energy of at least one light pulse of the plurality of light pulses, wherein the pulse energy of at least one light pulse is between 10 nanojoules and 10 microjoules.

15. The method of claim 13, wherein a pulse repetition rate of at least a portion of the plurality of light pulses is between 50 kilohertz and 1 megahertz.

16. The method of claim 11, wherein the light source comprises a fiber laser operable to emit light having a wavelength of 905 nanometers or 1550 nanometers.

17. The method of claim 16, wherein dynamically adjusting the per pulse energy of the at least subsequent one light pulse comprises adjusting at least one of a seed laser operating parameter or a pump laser operating parameter.

18. The method of claim 11, wherein dynamically adjusting the per pulse energy of the at least one subsequent light pulse is further based on a laser safety standard.

19. The system of claim 1, wherein the predetermined distance is between 60 and 200 meters away from the vehicle, and wherein the predetermined height is between 0 and 4 meters above the roadway.

20. The method of claim 11, wherein the predetermined distance is between 60 and 200 meters away from the vehicle, and wherein the predetermined height is between 0 and 4 meters above the roadway.

* * * * *